United States Patent
Zhang et al.

(10) Patent No.: US 8,948,297 B2
(45) Date of Patent: Feb. 3, 2015

(54) METHOD OF MAINTAINING COHERENCY OF A PRECODING CHANNEL IN A COMMUNICATION NETWORK AND ASSOCIATED APPARATUS

(75) Inventors: Xiaobo Zhang, Shanghai (CN); Mingli You, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 197 days.

(21) Appl. No.: 13/390,586

(22) PCT Filed: Aug. 17, 2009

(86) PCT No.: PCT/CN2009/073310
§ 371 (c)(1),
(2), (4) Date: Feb. 15, 2012

(87) PCT Pub. No.: WO2011/020235
PCT Pub. Date: Feb. 24, 2011

(65) Prior Publication Data
US 2012/0140851 A1    Jun. 7, 2012

(51) Int. Cl.
*H04L 25/49* (2006.01)
*H04B 7/04* (2006.01)
(Continued)

(52) U.S. Cl.
CPC .......... *H04B 7/0456* (2013.01); *H04B 17/0067* (2013.01); *H04L 25/0222* (2013.01); *H04B 7/0626* (2013.01)
USPC ...................................................... 375/296

(58) Field of Classification Search
USPC ................ 375/259–260, 267, 285, 295–296; 370/334, 465
See application file for complete search history.

(56) References Cited

U.S. PATENT DOCUMENTS

| 7,912,140 B2 * | 3/2011 | Anholt et al. ................ 375/262 |
| 2006/0039497 A1 * | 2/2006 | Vu et al. ........................ 375/267 |

(Continued)

FOREIGN PATENT DOCUMENTS

| CN | 101207600 A | 6/2008 |
| CN | 101217304 A | 7/2008 |

(Continued)

OTHER PUBLICATIONS

International Search Report for PCT/CN2009/073310 dated May 27, 2010.

*Primary Examiner* — Khanh C Tran
(74) *Attorney, Agent, or Firm* — Fay Sharpe LLP

(57) ABSTRACT

In prior art, selection of precoding granularity is affected by two inter-restricting factors, i.e., precoding accuracy and channel estimation at a mobile terminal. To solve this problem, the present invention provides a method of maintaining coherency of a precoding channel in a communication network and an associated apparatus. During precoding, this method takes into account both channel coherency and system capacity. A base station adjusts phase and/or amplitude of a precoding matrix corresponding to each precoded unit to maintain coherency of associated information of the overall precoding channel. The associated information of the precoding channel includes, for example, CSI or eigenvalue matrix of the precoding channel. Afterwards, a mobile terminal performs channel estimation based on reference signals of multiple precoded units, thereby eliminating the limitation in prior art that a mobile terminal can perform channel estimation only within one or more resource block limited by a precoding granularity.

15 Claims, 7 Drawing Sheets

(51) Int. Cl.
*H04B 17/00* (2006.01)
*H04L 25/02* (2006.01)
*H04B 7/06* (2006.01)

(56) References Cited

U.S. PATENT DOCUMENTS

| | | | |
|---|---|---|---|
| 2006/0193294 A1* | 8/2006 | Jorswieck et al. | 370/334 |
| 2007/0058744 A1* | 3/2007 | Amirkhany et al. | 375/260 |
| 2008/0192704 A1 | 8/2008 | Kent et al. | |
| 2009/0010148 A1* | 1/2009 | Hara | 370/208 |
| 2009/0061786 A1 | 3/2009 | Malik et al. | |

FOREIGN PATENT DOCUMENTS

| | | |
|---|---|---|
| CN | 101291526 A | 10/2008 |
| CN | 101330486 A | 12/2008 |
| CN | 101374034 A | 2/2009 |
| JP | 2006-504367 A | 2/2006 |
| JP | 2008-536342 A | 9/2008 |
| KR | 10-2005-0009233 | 1/2005 |
| WO | WO 2004/039027 A2 | 5/2004 |
| WO | WO 2006/052890 | 5/2006 |
| WO | WO 2008/060105 | 5/2008 |
| WO | WO 2009/023860 A1 | 2/2009 |

* cited by examiner

-- Prior Art --

# METHOD OF MAINTAINING COHERENCY OF A PRECODING CHANNEL IN A COMMUNICATION NETWORK AND ASSOCIATED APPARATUS

FIELD OF THE INVENTION

The present invention relates to a wireless communication system, and more particularly, to a method of processing a precoding matrix in a base station and associated apparatus.

BACKGROUND OF THE INVENTION

Non-codebook based precoding is a promising technology for a time division duplex (TDD) long term evolution-advanced (LTE-A) system, due to inherent channel reciprocity, namely symmetry between an uplink frequency and a downlink frequency. The industry widely accepts the assumption of uplink-downlink reciprocity and channel estimation is effectively performed based on this assumption.

In the case of non-codebook based precoding, the precoding matrix is obtained at the transmitting end. The transmitting end utilizes predicated channel status information (CSI) to calculate the precoding matrix. Common methods of calculating a precoding matrix include singular value decomposition (SVD), uniform channel decomposition (UCD) and the QR algorithm.

FIG. 1 is a structural diagram illustrating a transmitter and a receiver in a SVD-based multiple input multiple output (MIMO) system. Given that the transmitter of a base station 1 has N antennas and the receiver of a mobile terminal 2 has M antennas, the dimension of the effective uplink CSI, i.e., the spatial channel matrix, is M×N, and the spatial channel matrix may be denoted as $H_{M \times N}$. $H_{M \times N}$ is processed according to SVD shown in formula (1):

$$H = UDV^H \tag{1}$$

where U and V are the left singular vector matrix and the right singular vector matrix of H, respectively. Both U and V are a unitary matrix, i.e., it follows $UU^H = I = VV^H$, where I is an identity matrix and $(\bullet)^H$ denotes hermitian operation resulting in a transposed complex conjugate. It follows that $U \in C^{N \times N}$, i.e., the dimension of U is N×N, and that $V \in C^{M \times M}$, i.e., the dimension of V is M×M. The rank r of the CSI matrix H satisfies r≤min(M,N). The diagonal matrix D can be represented as $$D = \begin{bmatrix} D^r & 0 \\ 0 & 0 \end{bmatrix}_{N \times M},$$

where $D^r = \mathrm{diag}(\lambda_1, \lambda_2, \ldots \lambda_r)$ and $\lambda_i$ is singular value of H in descending order, i.e., $\lambda_1 > \lambda_2 > \ldots \lambda_r$.

The right singular vector matrix V obtained after SVD is a linear precoding matrix. Each column of V is called an eigenvector of $H^H H$, which is related to the eigenmode of the communication channel. If rank self-adaption is required, column vectors corresponding to greater singular values are selected from the right singular vector matrix V to compose the precoding matrix.

Non-codebook based precoding requires a dedicated pilot, which means data symbols and pilot symbols are precoded together. Thus the receiving end can obtain the effective channel after precoding by only performing channel estimation, thereby facilitating data modulation.

Since accurate CSI can be obtained due to reciprocity between the uplink and the downlink in a TDD system, non-codebook based precoding can provide additional precoding gain. Generally and theoretically, the smaller a precoding granularity is, the higher the corresponding precoding gain becomes. Precoding granularity is defined as a unit to be precoded, such as one or more resource block (RB). FIG. 2 illustrates precoding performance corresponding to different precoding granularities in a single-layer beamforming case. As shown, given equal signal to noise ratio (SNR), the smaller the precoding granularity is utilized, the greater the system throughput becomes. A precoding granularity of 10 means that 10 RBs employ the same precoding matrix. However, there is difference between channel responses corresponding to the 10 RBs. Therefore, the greater a precoding granularity is set, the less accurately a precoding matrix weighting all the RBs in the precoding granularity matches the actual channel status of each RB in the precoded unit. Consequently, taking into account matching of a precoding matrix and a channel, it is desirable to have a smaller precoding granularity to obtain a greater precoding gain.

However, in a practical system, performance gain of precoding is affected by channel estimation error (3GPP R1-092794). Since a smaller precoding granularity utilizes a lower reference signal (RS) power, accuracy of channel estimation is reduced. Therefore, an appropriately selected precoding granularity inevitably affects the system capacity. Furthermore, selection of precoding granularity is also an important issue for a multiple-user multiple input multiple output (MU-MIMO) system or a coordinative multiple point (CoMP) system sensitive to different multi-path delays between different user equipments or cells.

The above conclusion relies on the fact that channel estimation can be performed only within a precoding granularity. This is because each precoding granularity corresponds to a different precoding matrix and a different precoding matrix will corrupt channel coherency among multiple precoded units. Therefore, taking precoding accuracy into account, it is desirable to have a smaller precoding granularity. On the other hand, taking channel estimation into account, it is desirable to have a greater precoding granularity. Consequently, these two factors inter-restrict.

In a prior art solution, a base station dynamically monitors the channel to obtain its real-time status and then selects a corresponding precoding granularity according to information such as channel coherency, signal to interference and noise ratio (SINR), etc. Then, the base station transmits the selected precoding granularity to a mobile terminal. The mobile terminal performs channel estimation according to this indication within the resource blocks limited by the precoding granularity. The terminal needs to be notified of such indication real-time. Therefore, a lot of time-frequency resources are occupied.

SUMMARY OF THE INVENTION

The present invention analyzes channel coherency among multiple precoded units. The so called coherency is statistical characteristics of a channel, i.e., frequency selective characteristics and time variant characteristics of the channel. Furthermore, the present invention provides a method of coherent time frequency precoding (CTFP). This method takes into account both channel coherency and system capacity. A base station (eNB) adjusts phase and/or amplitude of a precoding matrix corresponding to each precoded unit to maintain coherency of associated information of the overall precoding channel. The associated information of the precoding channel includes, for example. CSI or eigenvalue matrix of the precoding channel. Afterwards, a mobile terminal performs channel estimation based on reference signals of multiple precoded units, thereby eliminating the limitation in prior art that a mobile terminal can perform channel estimation only within one or more resource block limited by a precoding granularity. In other words, the base station can employ a precoding granularity as small as possible without affecting channel estimation at the side of the mobile terminal.

According to a first aspect of the present invention, there is provided a method of transmitting a pilot and/or data weighted by a precoding matrix in a base station of a wireless communication system, wherein the base station obtains channel status information. The method includes: performing matrix decomposition to the channel status information to obtain an initial precoding matrix, wherein the initial precoding matrix is not unique; performing linear transformation to the initial precoding matrix such that information associated with an corrected precoding channel under the condition of weighting of the linearly transformed precoding matrix maintains coherency; transmitting to a mobile terminal the pilot and/or data weighted by the linearly transformed precoding matrix.

According to a second aspect of the present invention, there is provided a processing apparatus for transmitting a pilot and/or data weighted by a precoding matrix in a base station of a wireless communication system, wherein the base station obtains channel status information. The apparatus includes: an initial precoding matrix obtaining means for performing matrix decomposition to the channel status information to obtain an initial precoding matrix, wherein the initial precoding matrix is not unique; an correcting means for performing linear transformation to the initial precoding matrix such that information associated with an corrected precoding channel under the condition of weighting of the linearly transformed precoding matrix maintains coherency; a transmitting means for transmitting to a mobile terminal the pilot and/or data weighted by the linearly transformed precoding matrix.

The solution of the present invention enables a base station to perform precoding within a precoded unit of smaller precoding granularity, thereby increasing precoding gain. Moreover, it enables a mobile terminal to perform channel estimation based on reference signals of multiple precoded units and thus eliminates the limitation in prior art that a mobile terminal can perform channel estimation only within one or more time frequency resource block limited by a precoding granularity, thereby improving channel estimation performance of the mobile terminal. In addition, the base station doesn't need to provide the mobile terminal with indication about the precoding granularity, thereby saving corresponding signaling overhead. In a MU-MIMO and CoMP system, this solution enables selection of optimum precoding granularity between a base station and a user without considering channel characteristics of a coordinate base station or terminal.

BRIEF DESCRIPTION OF THE DRAWINGS

Other features, objectives and advantages of the present invention will become more apparent by studying the following detailed description of non-limiting embodiments, with reference to the accompanying drawings, wherein below.

Figure 1:
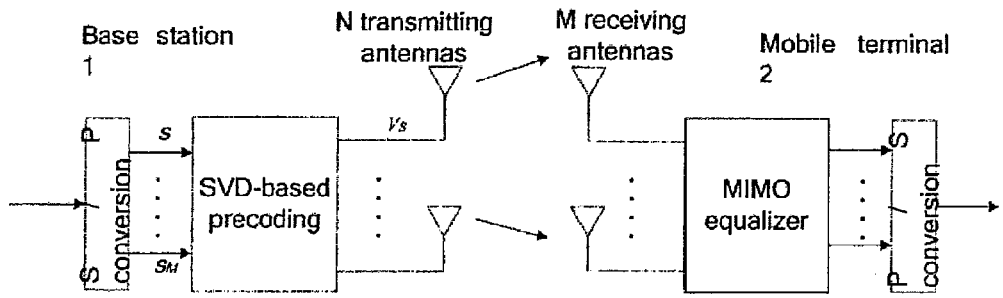
FIG. 1 is a structural diagram illustrating a transmitter and a receiver in a SVD-based MIMO system.
Figure 2:
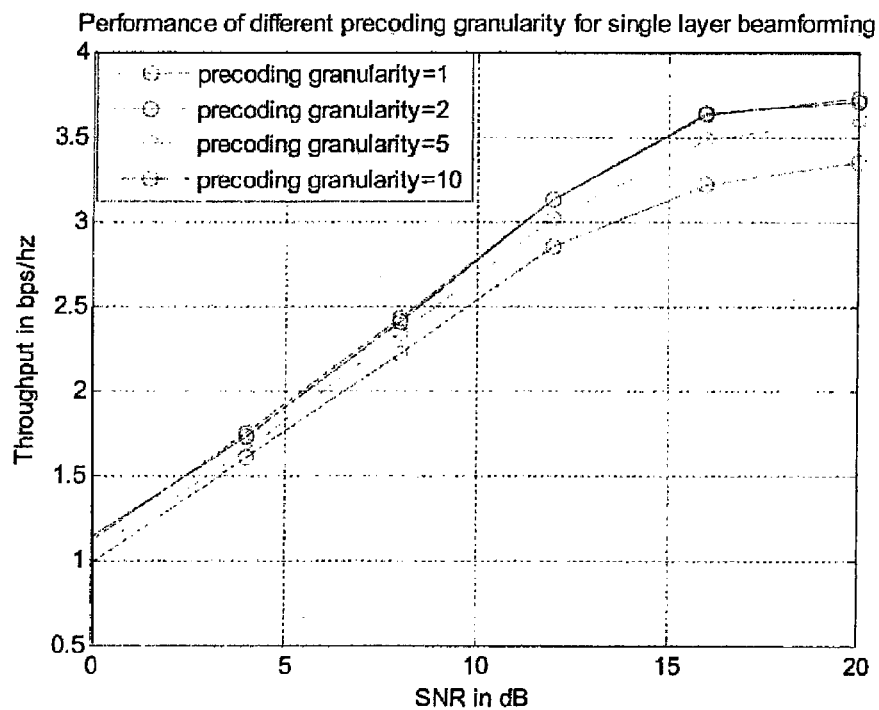
FIG. 2 illustrates the precoding performance corresponding to different precoding granularities in a single-layer beamforming case.

Identical or similar reference signs in the drawings represent identical or similar components.

DETAILED DESCRIPTION OF PREFERRED EMBODIMENTS

The following formula can be obtained by performing singular value decomposition to a MIMO channel matrix:

$$H_i = U_i D_i V_i^H \quad (2)$$

where i is the index of a precoded unit, $D_i$ is an eigenvalue matrix, i.e., singular value matrix, and $V_i^H$ is the hermitian transformation of $V_i$. As is well-known, the weighting matrices $U_i$ and $V_i$ of SVD are not unique. For example, formula (1) remains equal if the first columns or the identical columns of both $U_i$ and $V_i^H$ are rotated by $\pi \pm 2k\pi$.

Figure 3:
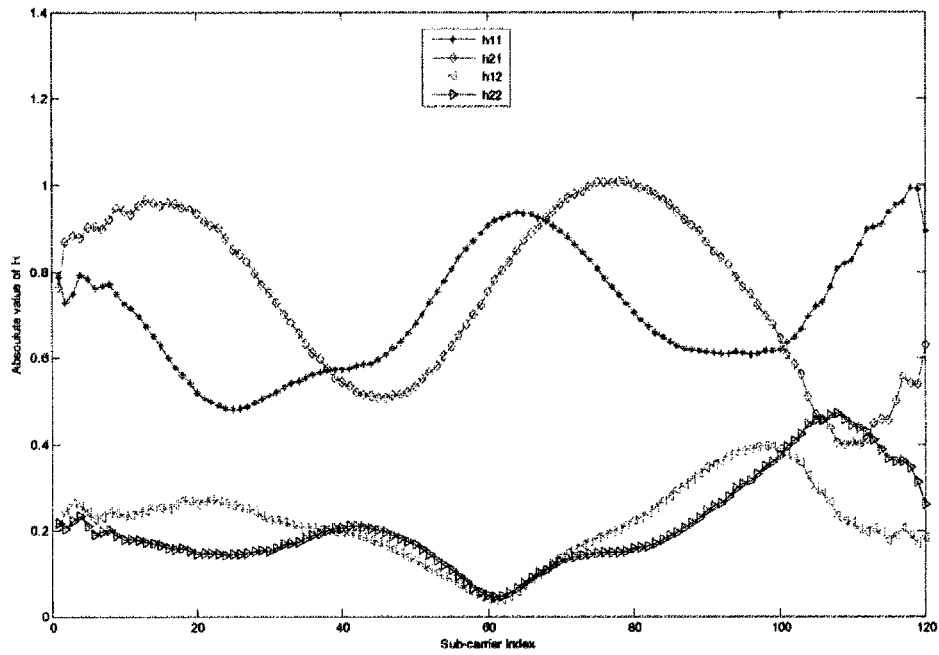
FIG. 3 illustrates absolute value of amplitude of the channel after the precoding of an initial precoding matrix.
Figure 4:
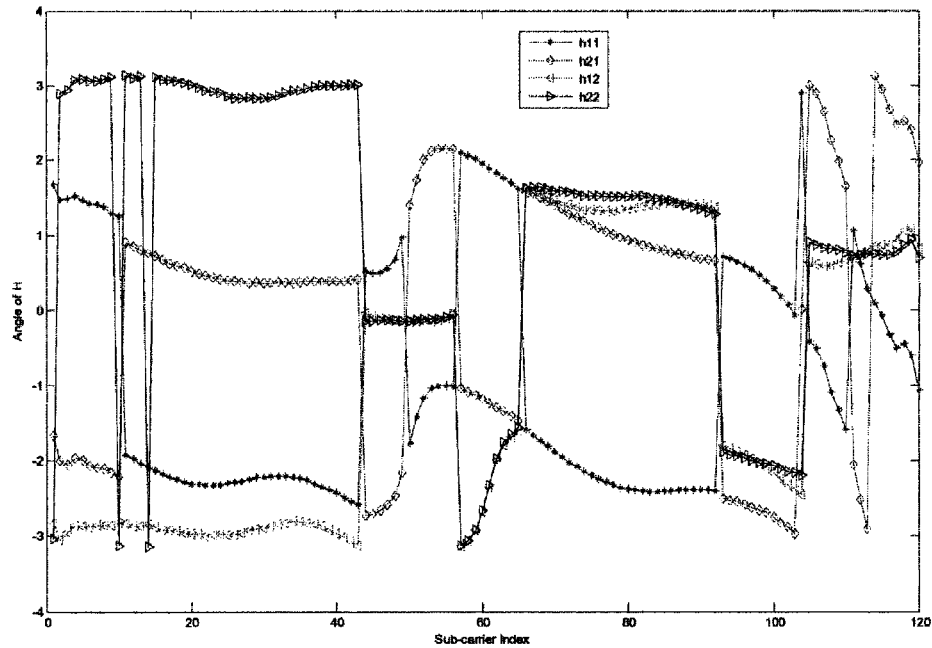
FIG. 4 illustrates phase of the channel after the precoding of an initial precoding matrix.

Taking a case of two transmitting antennas (TX) and two receiving antennas (RX) for example, FIGS. 3 and 4 are a frequency domain expression of an initial precoding channel (each sub-carrier) after the precoding of an initial precoding matrix, for a typical spatial channel model (SCM). FIG. 3 illustrates absolute value of amplitude of the initial precoding channel after the precoding of an initial precoding matrix, and FIG. 4 illustrates the phase of the initial precoding channel after the precoding of an initial precoding matrix.

In FIGS. 3 and 4, $h_{11}$ represents the impulse response of a channel from an antenna TX1 to an antenna RX1, $h_{12}$ represents the impulse response of a channel from the antenna TX1 to an antenna RX2, $h_{21}$ represents the impulse response of a channel from an antenna TX2 to the antenna RX1, and $h_{22}$ represents the impulse response of a channel from the antenna TX2 to the antenna RX2. The channel matrix is $$H_i = \begin{bmatrix} h_{11} & h_{12} \\ h_{21} & h_{22} \end{bmatrix}.$$

In this embodiment, the matrix $V_i$ obtained after performing SVD to the channel matrix based on formula (1) serves as the initial precoding matrix of a channel corresponding to each precoded unit. Therefore, the initial precoding channel is $H_{ip0} = H_i V_i = U_i D_i V_i^H V_i = U_i D_i$, where i=0, 1, 2, 3 ... 120 representing the index of a precoding granularity, p0 represents an initial precoding channel.

In FIGS. 3 and 4, a DFT-based channel estimation algorithm is utilized to estimate channel parameters. As easily seen, absolute value of amplitude of the initial precoding channel is coherent/smooth, but there are some jump points or jump segment on the phase curve. Moreover, one column (e.g., an eigenvector) of the initial preceding channel has the same change segment.

Note that in FIGS. 3 and 4, for purposes of illustration, each sub-carrier utilizes a precoding sub-channel corresponding to a different SVD. In other words, the precoding granularity shown in FIGS. 3 and 4 is one sub-carrier. For precoding of each resource block, possible jump points occur between the edges of two neighboring resource blocks. When a precoded unit includes multiple resource blocks, possible jump points occur between the edges of two neighboring precoded units.

Hereinafter is described how to compensate channel coherency corrupted due to use of a precoding matrix, according to different embodiments of the present invention.

A. Keep a Precoding Channel Coherent

Solution 1: Phase Rotation

First, the following description is provided taking a case where the precoded unit includes one sub-carrier for example. A person skilled in the art would understand that a precoded unit may include multiple sub-carriers, such as one or more resource block. In an OFDM system, each resource block includes 12 sub-carriers.

Firstly, channel status information is obtained. For a TDD system, the base station 1 may estimate the downlink channel according to the received uplink reference signal transmitted by the mobile terminal 2, to obtain a channel matrix. And in a FDD system, the mobile terminal 2 measures the downlink channel and feeds back the measured downlink channel to the base station 1, and thus the base station 1 can obtain the downlink channel matrix.

Then, the base station 1 performs matrix decomposition to the downlink channel matrix, to obtain an initial precoding matrix. In a preferable embodiment, SVD is utilized to obtain an initial precoding matrix V. In a varied embodiment, QR decomposition may be utilized to obtain an initial precoding matrix Q, where Q represents an orthogonal matrix and R represents an upper triangular matrix. Note that the solution of these matrix decompositions is not unique. Therefore, the obtained corresponding precoding matrix is also not unique.

Then, a phase rotation matrix is used, to keep coherent the channel precoded by the initial precoding matrices corresponding to multiple different precoded units. Therefore, the new precoding matrix is represented by:

$$F_i = V_i G_i \quad (3)$$

where $G_i$ is a diagonal matrix utilized to adjust the phase of the initial precoding channel $U_i D_i$ such that channel coherence between multiple precoded units is recovered.

Figure 5:
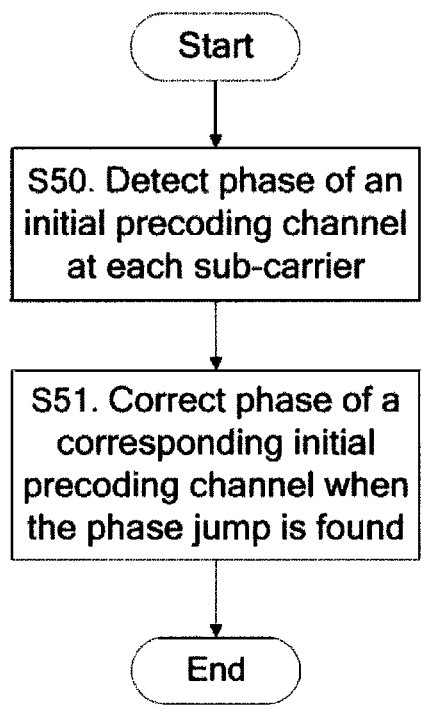
FIG. 5 is a flowchart illustrating a method according to an embodiment of the present invention.

FIG. 5 is a flowchart illustrating a method according to an embodiment of the present invention.

In step S50, the base station 1 detects phase of an initial precoding channel at each sub-carrier and obtains phase of the initial precoding channel at the sub-carrier neighboring each sub-carrier. For example, the base station 1 hopes to investigate phase of one sub-carrier, which is called a target sub-carrier hereinafter.

Then in step S51, the base station 1 compares the difference between the phase of the initial precoding channel at the target sub-carrier and the phase of an corrected (initial) precoding channel at a neighboring sub-carrier with $(-2\pi, -\pi, 0, \pi, 2\pi)$. Optionally, the neighboring sub-carrier is the immediately preceding sub-carrier of the target sub-carrier. If the difference is closest to 0 or $\pm 2\pi$, it follows that the phase of the initial precoding channel at the target sub-carrier has not jumped with respect to that of the corrected (initial) precoding channel at the immediately preceding sub-carrier; otherwise, if the difference is closest to $\pm\pi$, it follows that the phase of the initial precoding channel at the target sub-carrier has jumped with respect to that of the corrected (initial) precoding channel at the immediately preceding sub-carrier. For example, the differences between on one hand $h_{11}$ and $h_{21}$ in the initial precoding channel taking i as 1 and on the other hand $h_{11}$ and $h_{21}$ in the initial precoding channel taking i as 0 are closest to $\pi$, while the differences between on one hand $h_{12}$ and $h_{22}$ in the initial precoding channel taking i as 1 and on the other hand $h_{12}$ and $h_{22}$ in the initial precoding channel taking i as 0 are closest to $2\pi$, then a diagonal matrix $G_1$ is constructed, $$G_1 = \begin{bmatrix} -1 & 0 \\ 0 & 1 \end{bmatrix}.$$

Therefore, the corrected precoding channel $H_{1p1}$ weighted by a precoding matrix transformed by the diagonal matrix $G_1$ makes $H_{1p1}$ and $H_{0p1}$ continuous, where subscript p1 represents a corrected precoding channel. Then, phase of the initial preceding channel at the second sub-carrier is compared with phase of the corrected initial preceding channel at the first sub-carrier. Generally, $H_{ip1} = H_i V_i G_i = U_i D_i V_i^H V_i G_i = U_i D_i G_i$, $G_i$ makes continuous the phase of the corrected preceding matrix of the i-th preceded unit and that of the corrected preceding matrix of the i−1-th preceded unit.

When the preceded unit includes multiple sub-carriers, preceding channels corresponding to sub-carriers with the same index within different preceded units are compared, because each sub-carrier in the same preceded unit utilizes the same preceding matrix. For example, in step S50', the base station 1 detects phase of the initial preceding channel at the first sub-carrier in each preceded unit. Then, according to the phase of the initial preceding channel at the first sub-carrier in the i-th preceded unit and the phase of the corrected (initial) preceding channel at the first sub-carrier in the i−1-th preceded unit, if discontinuous phase is found, in step S51', phase of each sub-carrier in the i-th preceded unit is adjusted accordingly.

Figure 6:
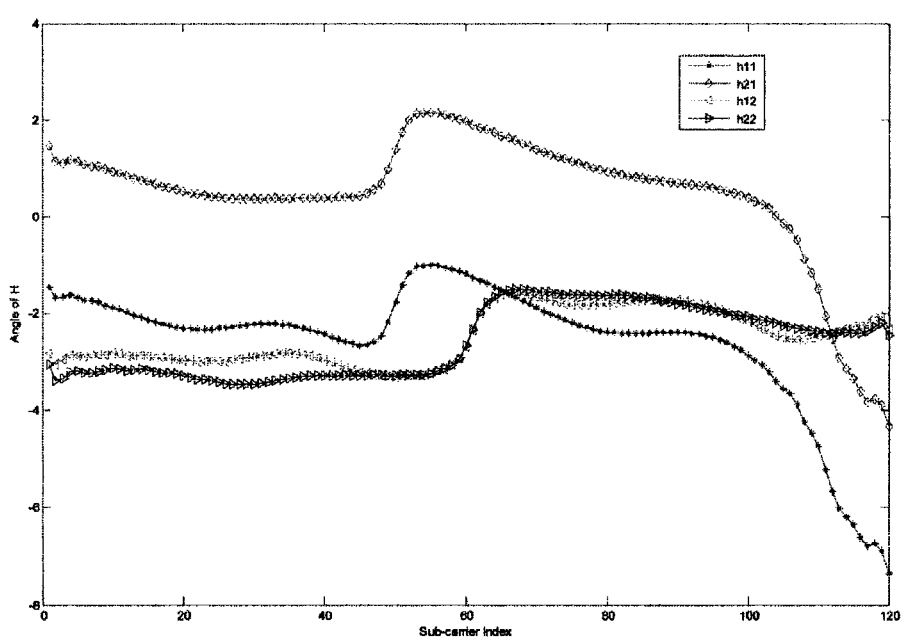
FIG. 6 illustrates a channel curve with respect to that of FIG. 4, after phase rotation.

FIG. 6 illustrates a channel curve with respect to that of FIG. 4, after phase rotation.

Due to complexity of mobile environment, a signal from a transmitter to a receiver usually includes multiple signal components resulting from reflection, diffraction, etc. And different signal components arrive at the receiver with different strength, time, and direction, which vary greatly in different environments. Due to different time-of-arrival of the different multipath components, the received signal is spread in the time domain. The basic feature of multipath propagation is that each path of signals arriving at the receiver has different attenuation factors and delays. The time domain spread of the received signal is called delay spread, which directly reflects the frequency selectivity of a channel (different frequency spectrums of a signal carry different power). Delay spread is defined as the maximum delay among multiple paths. Therefore, the time domain characteristics of the preceding channel with rotated phase, i.e., the corrected preceding channel, is further observed.

Statistical characteristics of a preceding channel with rotated phase and a non-precoded channel are compared. Taking into account channel coherency in frequency domain, the present disclosure utilizes precoding of each resource block with rotated phase to approximate a more practical scenario. The precoding channel with rotated phase is transformed to the time domain (corresponding to 120-point IFFT allocated for 10 resource blocks). The observed statistical characteristics are shown in FIGS. 7 and 8.

Figure 7:
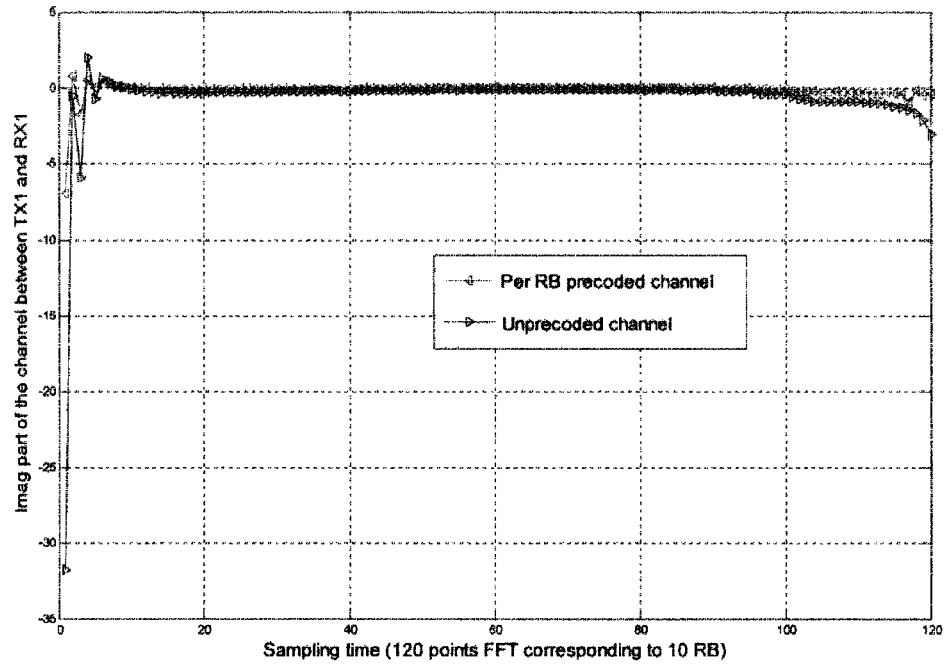
FIGS. 7 and 8 illustrate a channel curve of a time domain response obtained by domain transforming to the channel of FIG. 6.
Figure 8:
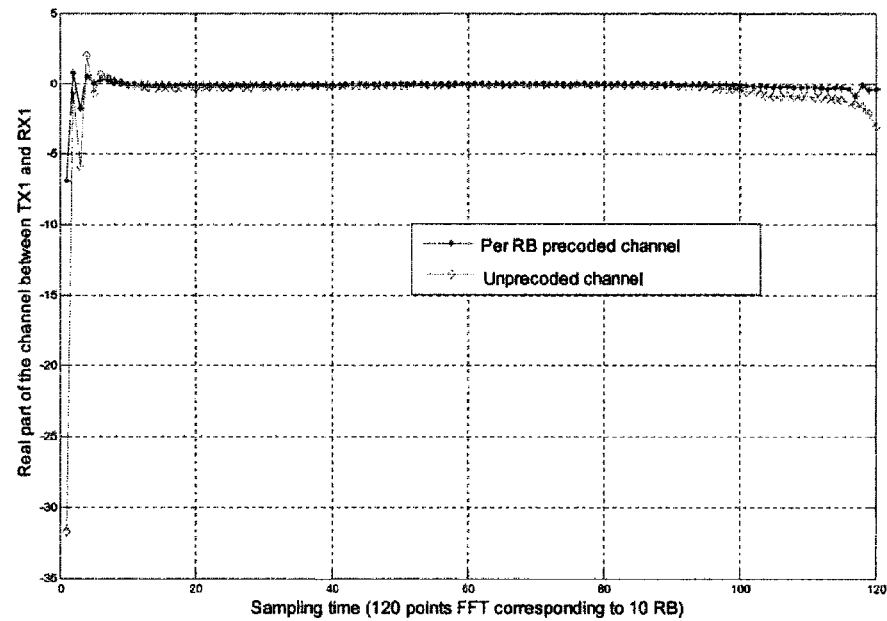

As shown in FIGS. 7 and 8, the corrected precoding channel after precoding has very similar statistical characteristics to that of a raw channel without precoding. Therefore, a user equipment can perform channel estimation at the allocated resources to determine parameters of the precoding channel.

In solution 1, when selecting $G_i$, division is mainly performed according to different sub-carriers in the frequency domain. In the above example, impulse responses of initial precoding channels of one or more sub-carrier in a precoding granularity and one or more sub-carrier in a neighboring precoding granularity are compared to perform correction. Besides frequency domain, time domain coherency may also be considered in phase rotation operation, if necessary. In other words, coherency between one or more symbol (time slot, or subframe) in a precoding granularity and one or more symbol (time slot, or subframe) in a neighboring precoding granularity is considered. Operations performed to keep time domain coherency between different precoding granularities are similar to those performed to keep frequency domain coherency. Obviously, correction for keeping time domain coherency may be performed after the correction for keeping frequency domain coherency, or may be performed separately.

Solution 2: Amplitude Smoothing

Firstly, channel status information is obtained. For a TDD system, the base station 1 may estimate the downlink channel according to the received uplink reference signal transmitted by the mobile terminal 2 to obtain a channel matrix. And in a FDD system, the mobile terminal 2 measures the downlink channel and feeds back the measured downlink channel to the base station 1, and thus the base station 1 can obtain the downlink channel matrix.

Then, the base station 1 performs matrix decomposition to the downlink channel matrix to obtain an initial precoding matrix. In a preferable embodiment, SVD is utilized to obtain an initial precoding matrix V. In a varied embodiment, QR decomposition may be utilized to obtain an initial precoding matrix Q, where Q represents an orthogonal matrix and R represents an upper triangular matrix. Note that the solution of these matrix decompositions is not unique. Therefore, the obtained corresponding precoding matrix is also not unique.

Figure 9:
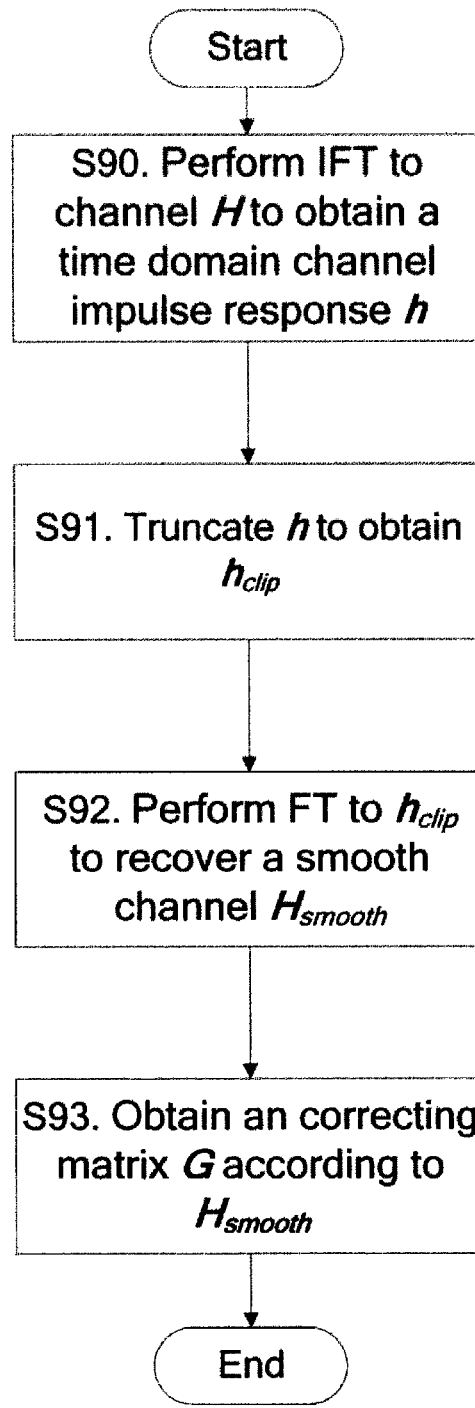
FIG. 9 is a flowchart illustrating a method according to another embodiment of the present invention.

Besides phase rotation, the matrix $G_i$ may also be utilized to smooth amplitude of the initial precoding channel. Hereinafter is provided detailed description of an FFT-based smoothing solution with reference to FIG. 9. Phase smoothing may be performed in an overall initial precoding channel consisting of initial precoding channels corresponding to multiple precoding granularities. The overall initial precoding channel is denoted as $H_{int\ precoded}$.

Firstly, in step S90, the base station 1 performs inverse Fourier transformation (IFFT) to the channel $H_{int\ precoded}$ and thus obtains a time domain channel impulse response h.

Then, in step S91, the base station 1 truncates h, keeps a certain length (e.g., a length of acyclic prefix), and sets the points that are truncated off to zeros, thereby obtaining $h_{clip}$.

For example, according to an expected maximum multipath delay, the base station 1 may keep the points in h before a time point corresponding to the expected maximum multipath delay and set the remaining points to zeros. This corresponds to reducing maximum multipath delay. And the shorter the maximum multipath delay is, the smoother the amplitude of the frequency domain channel becomes.

Then, in step S92, the base station 1 performs Fourier transformation (FFT) to $h_{clip}$ to recover a smooth channel $H_{smooth}$.

Then, in step S93, a correcting matrix G is obtained according to $H_{smooth}$, which can be expressed by $$G = H_{smooth} \cdot / (UD) \qquad (4)$$

where ·/ denotes scalar quantity division (element-wise division), meaning each element in a matrix is abstracted, the value of each element in multiple precoding unit is divided.

In solution 2, when selecting G, division is mainly performed according to different sub-carriers in the frequency domain. Besides frequency domain, time domain coherency may also be considered in amplitude smoothing operation if necessary. In other words, coherency between one or more symbol (time slot, or subframe) in a precoding granularity and one or more symbol (time slot, or subframe) in a neighboring precoding granularity is considered. Operations performed to keep time domain coherency between different precoding granularities are similar to those performed to keep frequency domain coherency. Obviously, correction for keeping t me domain coherency may be performed after correction for keeping frequency domain coherency, or be performed separately.

Solution 3: Combination of Phase Rotation and Amplitude Smoothing

In a varied embodiment, solutions 1 and 2 may be combined to correct the initial precoding matrix.

For example, after the operation of phase rotation, the operation of amplitude smoothing may be further performed to the matrix after phase rotation to further improve coherency of the precoding matrix.

Scenario A is completely transparent to a terminal, and no modification needs to be made to the mobile terminal 2.

Since the corrected precoding channel under the condition of the weighting of the corrected precoding matrix satisfies coherency, in the three solutions, the mobile terminal 2 can perform unified channel estimation across different precoding granularities.

B. Keep the Eigenvalue Matrix of the Precoding Channel Coherent

The matrix $G_i$ can be utilized to smooth the eigenvalue matrix $D_i$ of the precoding channel, instead of $U_i D_i$, such that $D_i G_i$ becomes a flat fading diagonal matrix.

Specifically, linear transformation may be performed to the initial precoding matrix UD, for example, by left multiplying the inverse matrix $U^{-1}$ of U. Then, subsequent operations are performed with reference to one of solutions 1-3 in scenario A. Note that when solution 2 is utilized to perform amplitude correction, formula (4) should be modified to formula (5):

$G = H_{smooth} \cdot / D$.

Since amplitude is adjusted, this solution for smoothing the eigenvalue matrix is actually a power allocation algorithm.

Since the corrected precoding channel under the condition of the weighting of the corrected precoding matrix satisfies coherency, the mobile terminal 2 can perform unified channel estimation across different precoding granularities.

Figure 10:
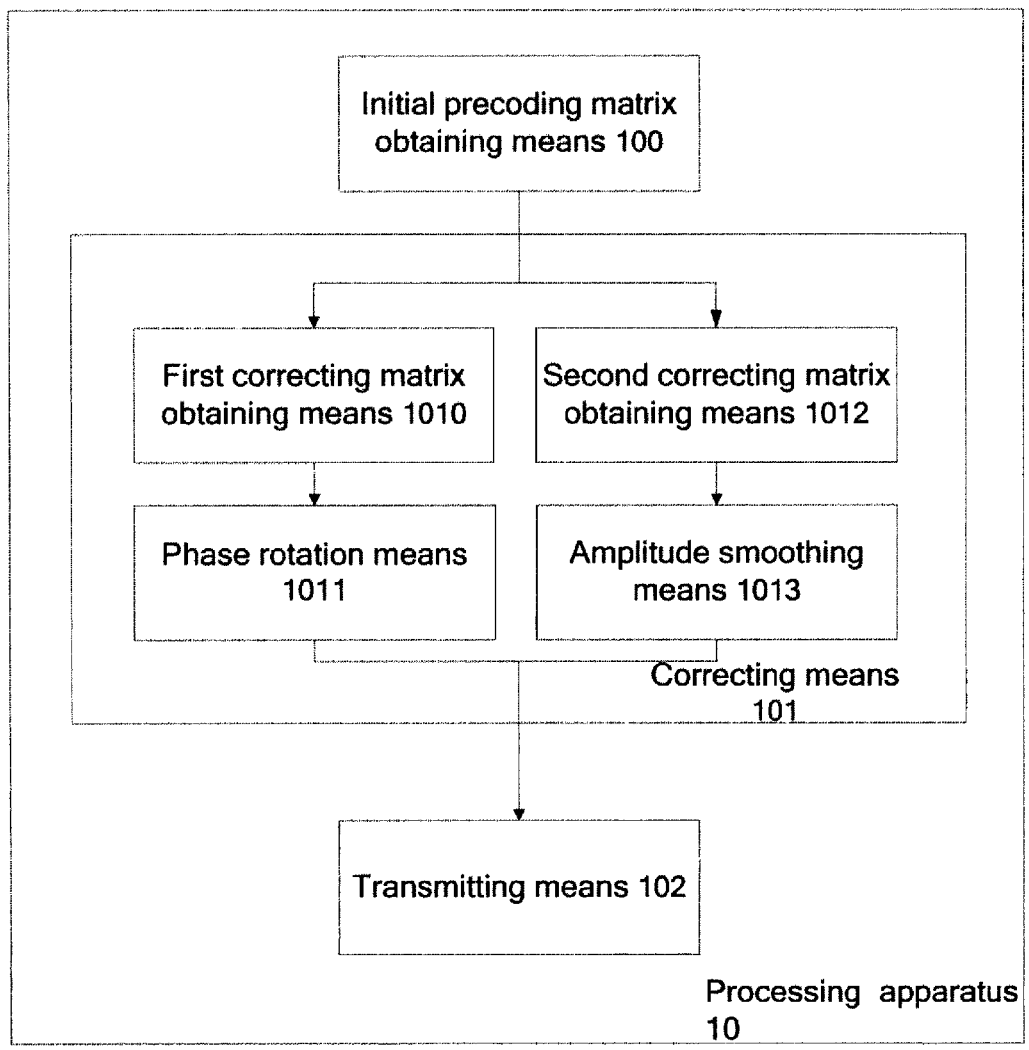
FIG. 10 is a block diagram illustrating an apparatus according to an embodiment of the present invention.

Hereinafter is provided a description of the present invention in the apparatus perspective. FIG. 10 is a block diagram illustrating an apparatus according to an embodiment of the present invention. The processing apparatus 10 in FIG. 10 is located in the base station 1. The processing apparatus 10 includes an initial precoding matrix obtaining means 100, a correcting means 101, and a transmitting means 102. Wherein, the correcting means 101 includes a first correcting matrix obtaining means 1010, a rotation means 1011, a second correcting matrix obtaining means 1012, an amplitude adjusting means 1013, and an eigenvalue matrix obtaining means 1014.

The following description is provided taking a case where the precoded unit includes one sub-carrier for example. A person skilled in the art would understand that a precoded unit may include multiple sub-carriers, such as one or more resource block. In an OFDM system, each resource block includes 12 sub-carriers.

Firstly, the initial precoding matrix obtaining means 100 obtains channel status information. For a TDD system, the initial precoding matrix obtaining means 100 may estimate the downlink channel according to the received uplink reference signal transmitted by the mobile terminal 2 to obtain a channel matrix. And in a FDD system, the mobile terminal 2 measures the downlink channel and feeds back the measured downlink channel to the initial precoding matrix obtaining means 100, and thus the base station 1 can obtain the downlink channel matrix.

Then, the initial precoding matrix obtaining means 100 performs matrix decomposition to the downlink channel matrix to obtain an initial precoding matrix. In a preferable embodiment, SVD is utilized to obtain the initial precoding matrix V. In a varied embodiment, QR decomposition may be utilized to obtain an initial precoding matrix Q, where Q represents an orthogonal matrix and R represents an upper triangular matrix. Note that the solution of these matrix decompositions is not unique. Therefore, the obtained corresponding precoding matrix is also not unique.

Then, a correcting matrix is utilized to keep coherence of the channels precoded by the initial precoding matrix corresponding to multiple different precoded units. Therefore, the new precoding matrix is represented by:

$$F_i = V_i G_i \quad (3)$$

where $G_i$ may be a diagonal matrix utilized to adjust the phase of the initial preceding channel $U_i D_i$ such that channel coherence between multiple precoded units is recovered.

Solution I: Phase Rotation

Firstly, the first correcting matrix obtaining means 1010 in the correcting means 101 detects the phase of an initial precoding channel at each sub-carrier and obtains the phase of an initial precoding channel at a sub-carrier neighboring each sub-carrier. For example, the base station 1 hopes to investigate the phase of one sub-carrier, which is called as a target sub-carrier hereinafter.

Then, the difference between the phase of the initial precoding channel at the target sub-carrier and that of an corrected (initial) precoding channel at a neighboring sub-carrier is compared with ($-2\pi$, $-\pi$, 0, $\pi$, $2\pi$). Optionally, the neighboring sub-carrier is the immediately preceding sub-carrier of the target sub-carrier. If the difference is closest to 0 or $\pm 2\pi$, it follows that the phase of the initial precoding channel at the target sub-carrier has not jumped with respect to that of the corrected (initial) precoding channel at the immediately preceding sub-carrier; otherwise, if the difference is closest to $\pm\pi$, it follows that the phase of the initial precoding channel at the target sub-carrier has jumped with respect to that of the corrected (initial) precoding channel at the immediately preceding sub-carrier. For example, the differences between on one hand $h_{11}$ and $h_{21}$ in the initial precoding channel taking i as 1 and on the other hand $h_{11}$ and $h_{21}$ in the initial precoding channel taking i as 0 are closest to $\pi$, while the differences between on one hand $h_{12}$ and $h_{22}$ in the initial precoding channel taking i as 1 and on the other hand $h_{12}$ and $h_{22}$ in the initial precoding channel taking i as 0 are closest to $2\pi$, then a diagonal matrix $G_1$ is constructed, $$G_1 = \begin{bmatrix} -1 & 0 \\ 0 & 1 \end{bmatrix}.$$

Therefore, the corrected precoding channel $H_{1p1}$ weighted by the precoding matrix transformed by the phase rotation means 1011 via the diagonal matrix $G_1$ makes $H_{1p1}$ and $H_{0p1}$ continuous, where subscript p1 represents a corrected precoding channel. Then, phase of the initial precoding channel at the second sub-carrier is compared with phase of the corrected initial precoding channel at the first sub-carrier. Generally, $H_{ip1} = H_i V_i G_i = U_i D_i V_i^H V_i G_i = U_i D_i G_i$, $G_i$ makes continuous the phase of the corrected precoding matrix of the i-th precoded unit and that of the corrected precoding matrix of the i-1-th precoded unit.

Then, the transmitting means 102 transmits to the mobile terminal 2 a pilot and/or data weighted by the precoding matrix corrected by the first correcting means.

When the precoded unit includes multiple sub-carriers, precoding channels corresponding to sub-carriers with the same index from different precoded units are compared because each sub-carrier in the same precoded unit utilizes the same precoding matrix. For example, the first correcting matrix obtaining means 1010 detects phase of the initial precoding channel at the first sub-carrier in each precoded unit. Then, according to the phase of the initial precoding channel at the first sub-carrier in the i-th precoded unit and the phase of the corrected (initial) precoding channel at the first sub-carrier in the i-1-th precoded unit, if discontinuous phase is found, the rotation means 1011 adjusts the phase of each sub-carrier in the i-th precoded unit accordingly.

FIG. 6 illustrates a channel curve with respect to that of FIG. 4, after phase rotation.

Due to complexity of mobile environment, a signal from a transmitter to a receiver usually includes multiple signal components resulting from reflection, diffraction, etc. And different signal components arrive at the receiver with different strength, time, and direction, which vary greatly in different environments. Due to different time-of-arrival of different multipath components, the received signal is spread in the time domain. The basic feature of multipath propagation is that each path of signals arriving at the receiver has different attenuation factors and delays. The time domain spread of the received signal is called as delay spread, which directly reflects frequency selectivity of a channel (different frequency spectrum of a signal carry different power). Delay spread is defined as the maximum delay among multiple paths. Therefore, the time domain characteristics of a precoding channel with rotated phase, i.e., a corrected precoding channel, is further observed.

Statistical characteristics of a precoding channel with rotated phase and a non-precoded channel are compared. Taking into account frequency domain channel coherency, the present disclosure utilizes precoding of each resource block with rotated phase to approximate a more practical scenario. The precoding channel with rotated phase is transformed to the time domain (120-point IFFT allocated for 10 resource blocks). The observed statistical characteristics are shown in FIGS. 7 and 8.

As shown in FIGS. 7 and 8, the corrected precoding channel after precoding has very similar statistical characteristics to that of a raw channel without precoding. Therefore, a user equipment can perform channel estimation at the allocated resources to determine parameters of the precoding channel.

In solution I, when selecting $G_i$, division is mainly performed according to different sub-carriers in the frequency domain. In the above example, impulse responses of initial precoding channels of one or more sub-carrier in a precoding granularity and one or more sub-carrier in a neighboring precoding granularity are compared to perform correction. Besides frequency domain, time domain coherency may also be considered in phase rotation operation if necessary. In other words, coherency between one or more symbol (time slot, or subframe) in a precoding granularity and one or more symbol (time slot, or subframe) in a neighboring precoding granularity is considered. Operations performed to keep time domain coherency between different precoding granularities are similar to those performed to keep frequency domain coherency. Obviously, correction for keeping time domain coherency may be performed after correction for keeping frequency domain coherency, or be performed separately.

Solution II: Amplitude Smoothing

Firstly, channel status information is obtained. For a TDD system, a base station 1 may estimate the downlink channel according to the received uplink reference signal transmitted by a mobile terminal 2 to obtain a channel matrix. And in a FDD system, the mobile terminal 2 measures the downlink channel and feeds back the measured downlink channel to the base station 1, and thus the base station 1 can obtain the downlink channel matrix.

Then, the base station performs matrix decomposition to the downlink channel matrix to obtain an initial precoding matrix. In a preferable embodiment, SVD is utilized to obtain an initial precoding matrix V. In a modified embodiment, QR decomposition may be utilized to obtain an initial precoding matrix Q, where Q represents an orthogonal matrix and R represents an upper triangular matrix. Note that the solution of these matrix decompositions s not unique. Therefore, the obtained corresponding precoding matrix is also not unique.

Besides phase rotation, the matrix $G_i$ may also be utilized to smooth amplitude of an initial precoding channel. Hereinafter is provided detailed description of an FFT-based smoothing solution with reference to FIG. 9. Phase smoothing may be performed in an overall initial precoding channel consisting of initial precoding channels corresponding to multiple precoding granularties. The overall initial precoding channel is denoted as $H_{int\ precoded}$.

Firstly, an inverse Fourier transforming means (not shown) in the second correcting matrix obtaining means 1012 performs inverse Fourier transforming (IFFT) to the channel $H_{int\ precoded}$ and thus obtains a time domain channel impulse response h.

Then, a truncating means (not shown) in the second correcting matrix obtaining means 1012 truncates h, keeps a certain length (e.g., a length of a cyclic prefix), and sets the points that are truncated off to zeros, thereby obtaining $h_{clip}$.

For example, according to an expected maximum multipath delay, the truncating means may keep the points in h before a time point corresponding to the expected maximum multipath delay and set the remaining points to zeros. This corresponds to reducing maximum multipath delay. And the shorter the maximum multipath delay is, the smoother the amplitude of the frequency domain channel becomes.

Then, an Fourier transforming means (not shown) in the second correcting matrix obtaining means 1012 performs Fourier transforming (FFT) to $h_{clip}$ to recover a smooth channel $H_{smooth}$.

Then, the second correcting matrix obtaining means 1012 obtains a correcting matrix G according to $H_{smooth}$, which can be expressed by $$G = H_{smooth}\cdot/(UD) \quad (4)$$

where ·/ denotes scalar quantity division (element-wise division), meaning each element in a matrix is abstracted, the value of each element in multiple precoding unit is divided.

Then, the amplitude smoothing means 1013 smoothes the amplitude of the initial precoding channel according to the precoding matrix corrected by the second correcting matrix G obtained by the second correcting means.

Then, the transmitting means 101 weights the data and pilot with the corrected precoding matrix corrected by the second correcting matrix and transmits them to the mobile terminal 2.

In solution when selecting G, division is mainly performed according to different sub-carriers in the frequency domain. Besides frequency domain, time domain coherency may also be considered in amplitude smoothing operation if necessary. In other words, coherency between one or more symbol (time slot, or subframe) in a precoding granularity and one or more symbol (time slot, or subframe) in a neighboring precoding granularity is considered. Operations performed to keep time domain coherency between different precoding granularities are similar to those performed to keep frequency domain coherency. Obviously, correction for keeping time domain coherency may be performed after correction for keeping frequency, domain coherency, or be performed separately.

Solution III: Combination of Phase Rotation and Amplitude Smoothing

In a varied embodiment, solutions I and II may be combined to correct the initial precoding matrix.

For example, after the operation of phase rotation, the operation of amplitude smoothing may be further performed to the matrix after phase rotation to further improve coherency of the precoding matrix.

The above three solutions are completely transparent to a terminal and no modification needs to be made to the mobile terminal 2.

Since the corrected precoding channel under the condition of weighting of the corrected precoding matrix satisfies coherency, in the three solutions, the mobile terminal 2 can perform unified channel estimation across different precoding granularities.

C. Keep Coherent the Eigenvalue Matrix of the Precoding Channel

The matrix $G_i$ can be utilized to smooth the eigenvalue matrix $D_i$ of the precoding channel, instead of $U_iD_i$, such that $D_iG_i$ becomes a flat fading diagonal matrix.

Figure 11:
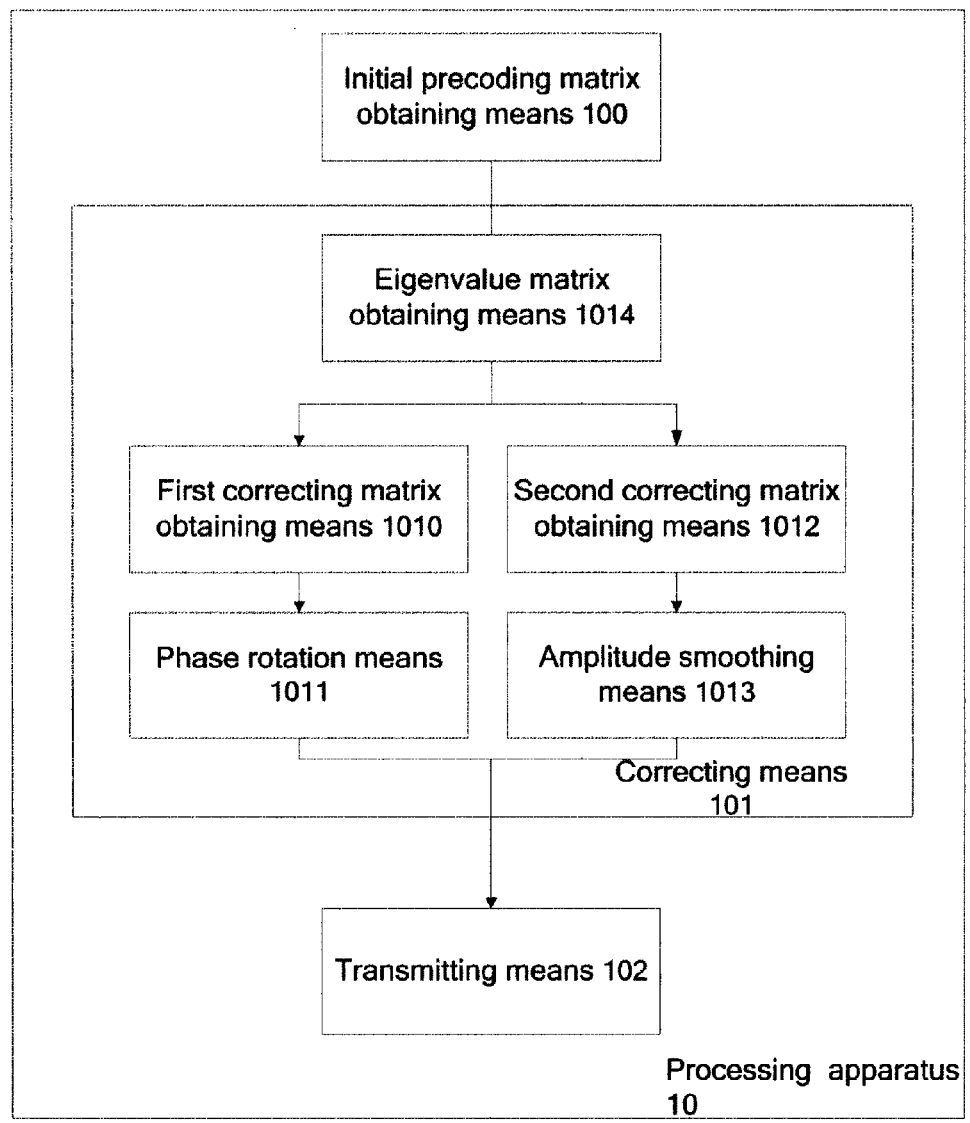
FIG. 11 is a block diagram illustrating an apparatus according to another embodiment of the present invention.

Specifically, referring to FIG. 11, the eigenvalue matrix obtaining means 1014 performs linear transformation to the initial precoding matrix UD, for example, by left multiplying the inverse matrix $U^{-1}$ of U. Then, subsequent operations are performed with reference to one of solutions 1-3 in scenario A. Note that when solution 2 is utilized to perform amplitude correction, formula (4) should be modified to formula (5):

$$G = H_{smooth}\cdot/D.$$

Since amplitude is adjusted, this solution for smoothing the eigenvalue matrix actually a power allocation algorithm.

Since the corrected precoding channel under the condition of weighting of the corrected precoding matrix satisfies coherency, the mobile terminal 2 can perform unified channel estimation across different precoding granularities.

Although the present invention is illustrated and described in the drawings and the above description, such illustration and description is explanatory and exemplary instead of limiting. Therefore, the present invention is not limited to the above embodiments.

Other variations to the disclosed embodiments can be understood and effected by those skilled in the art in practicing the claimed invention, from a study of the drawings, the

What is claimed is:

1. A method of transmitting at least one of a pilot and data weighted by a precoding matrix, said method carried out in a base station of a wireless communication system, wherein the base station obtains channel status information, the method comprising:
   performing matrix decomposition to the channel status information to obtain an initial precoding matrix, wherein the initial precoding matrix is not unique;
   performing linear transformation to the initial precoding matrix to obtain a linearly transformed precoding matrix such that information associated with a corrected precoding channel under a condition of weighting by the linearly transformed precoding matrix maintains coherency; and
   transmitting to a mobile terminal the at least one of the pilot and data weighted by the linearly transformed precoding matrix.

2. The method of claim 1, wherein performing the matrix decomposition comprises:
   performing a singular value decomposition to the channel status information, wherein a right unitary matrix resulting from the singular value decomposition is the initial precoding matrix.

3. A method of transmitting at least one of a pilot and data weighted by a precoding matrix, said method carried out in a base station of a wireless communication system, wherein the base station obtains channel status information, the method comprising:
   performing matrix decomposition to the channel status information to obtain an initial precoding matrix, wherein the initial precoding matrix is not unique;
   performing linear transformation to the initial precoding matrix to obtain a linearly transformed precoding matrix such that information associated with a corrected precoding channel under a condition of weighting by the linearly transformed precoding matrix maintains coherency; and
   transmitting to a mobile terminal the at least one of the pilot and data weighted by the linearly transformed precoding matrix
   wherein performing the matrix decomposition comprises:
      performing QR decomposition to the channel status information, wherein a Q matrix resulting from the QR decomposition is the initial precoding matrix.

4. A method of transmitting at least one of a pilot and data weighted by a precoding matrix, said method carried out in a base station of a wireless communication system, wherein the base station obtains channel status information, the method comprising:
   performing matrix decomposition to the channel status information to obtain an initial precoding matrix, wherein the initial precoding matrix is not unique;
   performing linear transformation to the initial precoding matrix to obtain a linearly transformed precoding matrix such that information associated with a corrected precoding channel under a condition of weighting by the linearly transformed precoding matrix maintains coherency; wherein performing the linear transformation comprises:
      obtaining a first correcting matrix according to an initial precoding channel under a condition of weighting by the initial precoding matrix; and
      performing linear transformation to the initial precoding matrix with the first correcting matrix to obtain the linearly transformed precoding matrix such that a phase of the corrected precoding channel under the condition of weighting by the linearly transformed precoding matrix is continuous; and
   transmitting to a mobile terminal the at least one of the pilot and data weighted by the linearly transformed precoding matrix.

5. The method of claim 4, further comprising:
   selecting a second correcting matrix according to an expected maximum multipath delay in time domain; and
   performing linear transformation to the corrected precoding channel with continuous phase via the second correcting matrix, such that an amplitude of the corrected precoding channel under the condition of weighting of the corrected precoding matrix linearly transformed by the second correcting matrix is smooth.

6. The method of claim 4, wherein the initial precoding channel comprises multiple precoded units and obtaining the first correcting matrix further comprises:
   obtaining phase of a neighboring precoding channel under the condition of weighting of respective neighboring precoding matrix, in neighboring precoded units of a target precoded unit in the initial precoding channel; and
   adjusting phase of a target precoding channel under the condition of weighting of a target precoding matrix corresponding to the target precoded unit, according to the phase of the neighboring precoding channel, such that the phase of the target precoding channel and the phase of the neighboring precoding channel are continuous.

7. The method of claim 6, wherein the precoded units comprise at least one of frequency resources and time resources.

8. A method of transmitting at least one of a pilot and data weighted by a precoding matrix, said method carried out in a base station of a wireless communication system, wherein the base station obtains channel status information, the method comprising:
   performing matrix decomposition to the channel status information to obtain an initial precoding matrix, wherein the initial precoding matrix is not unique;
   performing linear transformation to the initial precoding matrix to obtain a linearly transformed precoding matrix such that information associated with a corrected precoding channel under a condition of weighting by the linearly transformed precoding matrix maintains coherency; wherein performing the linear transformation comprises:
   selecting a first correcting matrix according to an expected maximum multipath delay in time domain; and
   performing linear transformation to the initial precoding matrix with the first correcting matrix to obtain the linearly transformed precoding matrix, such that an amplitude of the precoding channel under the condition of weighting by the linearly transformed precoding matrix is smooth; and
   transmitting to a mobile terminal the at least one of the pilot and data weighted by the linearly transformed precoding matrix.

9. The method of claim 8, further comprising:
   obtaining a second correcting matrix, according to the initial precoding channel under the condition of weighting of the initial precoding matrix;

performing linear transformation to the initial precoding matrix with the second correcting matrix, such that phase of the corrected precoding channel under the condition of weighting of the precoding matrix linearly transformed by the second correcting matrix is continuous; and performing linear transformation to the initial precoding matrix with the first correcting matrix further comprises:
performing linear transformation to the corrected precoding channel with continuous phase via the first correcting matrix, such that amplitude of the corrected precoding channel under the condition of weighting of the corrected precoding matrix linearly transformed by the first correcting matrix is smooth.

10. The method of claim 8, wherein the channel under the condition of weighting of the initial precoding matrix is an initial precoding channel and selecting the first correcting matrix comprises:
performing inverse Fourier transformation to the initial precoding channel, to obtain a time domain channel response;
truncating a plurality of preceding successive points in the time domain channel response according to the expected maximum multipath delay, and filling the remaining points with zeros, to generate a truncated time domain channel response;
performing Fourier transformation to the truncated time domain channel response to obtain the precoding channel with smooth amplitude; and
scalar quantity dividing the precoding channel of smooth amplitude with the initial precoding channel to obtain the first correcting matrix.

11. A method of transmitting at least one of a pilot and data weighted by a precoding matrix, said method carried out in a base station of a wireless communication system, wherein the base station obtains channel status information, the method comprising:
performing matrix decomposition to the channel status information to obtain an initial precoding matrix, wherein the initial precoding matrix is not unique;
performing linear transformation to the initial precoding matrix to obtain a linearly transformed precoding matrix such that information associated with a corrected precoding channel under a condition of weighting by the linearly transformed precoding matrix maintains coherency; and
transmitting to a mobile terminal the at least one of the pilot and data weighted by the linearly transformed precoding matrix;
wherein the channel under the condition of weighting of the initial precoding matrix is an initial precoding channel, the associated information comprises eigenvalue matrix of the channel, and performing linear transformation further comprises:
obtaining eigenvalue matrix of the initial precoding channel according to the initial precoding channel; and
adjusting amplitude of each eigenvalue in the eigenvalue matrix such that amplitudes of the eigenvalue matrix are smooth.

12. A processing apparatus for transmitting at least one of a pilot and data weighted by a precoding matrix in a base station of a wireless communication system, wherein the base station obtains channel status information, the apparatus comprising:
an initial precoding matrix obtaining part that performs a matrix decomposition on the channel status information to obtain an initial precoding matrix, wherein the initial precoding matrix is not unique;
a correcting part that performs a linear transformation to on the initial precoding matrix to obtain a linearly transformed precoding matrix such that information associated with a corrected precoding channel under a condition of weighting by the linearly transformed precoding matrix maintains coherency; and
a transmitter that transmits to a mobile terminal the at least one of the pilot and data weighted by the linearly transformed precoding matrix.

13. A processing for transmitting at least one of a pilot and data weighted by a precoding matrix in a base station of a wireless communication system, wherein the base station obtains channel status information, the apparatus comprising:
an initial precoding matrix obtaining part that performs a matrix decomposition on the channel status information to obtain an initial precoding matrix, wherein the initial precoding matrix is not unique;
a correcting part that performs a linear transformation on the initial precoding matrix to obtain a linearly transformed precoding matrix such that information associated with a corrected precoding channel under a condition of weighting by the linearly transformed precoding matrix maintains coherency; and
a transmitter that transmits to a mobile terminal the at least one of the pilot and data weighted by the linearly transformed precoding matrix;
wherein the correcting part comprises:
a correcting matrix obtaining part that obtains a correcting matrix according to an initial precoding channel under the condition of weighting by the initial precoding matrix; and
a phase rotation part that performs the linear transformation with the correcting matrix, such that a phase of the corrected precoding channel under the condition of weighting by the linearly transformed precoding matrix is continuous.

14. A processing apparatus for transmitting at least one of a pilot and data weighted by a precoding matrix in a base station of a wireless communication system, wherein the base station obtains channel status information, the apparatus comprising:
an initial precoding matrix obtaining part that performs a matrix decomposition on the channel status information to obtain an initial precoding matrix, wherein the initial precoding matrix is not unique;
a correcting part that performs a linear transformation on the initial precoding matrix to obtain a linearly transformed precoding matrix such that information associated with a corrected precoding channel under a condition of weighting by the linearly transformed precoding matrix maintains coherency; and
a transmitter that transmits to a mobile terminal the at least one of the pilot and data weighted by the linearly transformed precoding matrix;
wherein the correcting part comprises:
a correcting matrix obtaining part that selects a correcting matrix according to an expected maximum multipath delay in time domain; and
an amplitude smoothing part that performs the linear transformation with the correcting matrix, such that an amplitude of the corrected precoding channel under the condition of weighting by the linearly transformed precoding matrix is smooth.

15. A processing apparatus for transmitting at least one of a pilot and data weighted by a precoding matrix in a base station of a wireless communication system, wherein the base station obtains channel status information, the apparatus comprising:
- an initial precoding matrix obtaining part that performs a matrix decomposition on the channel status information to obtain an initial precoding matrix, wherein the initial precoding matrix is not unique;
- a correcting part that performs a linear transformation on the initial precoding matrix to obtain a linearly transformed precoding matrix such that information associated with a corrected precoding channel under a condition of weighting by the linearly transformed precoding matrix maintains coherency; and
- a transmitter that transmits to a mobile terminal the at least one of the pilot and data weighted by the linearly transformed precoding matrix;
- wherein the channel under the condition of weighting by the initial precoding matrix is an initial precoding channel, the associated information comprises an eigenvalue matrix of the channel, and the correcting part comprises:
- an eigenvalue matrix obtaining part that obtains the eigenvalue matrix of the initial precoding channel according to the initial precoding channel; and
- the correcting part is further used to correct an amplitude of each eigenvalue in the eigenvalue matrix such that amplitude of the eigenvalue matrix is smooth.

* * * * *